United States Patent [19]

Price-Falcón et al.

[11] Patent Number: 4,578,110
[45] Date of Patent: Mar. 25, 1986

[54] METHOD OF REDUCING IRON OXIDES

[75] Inventors: Juan F. Price-Falcón; Ricardo Viramontes-Brown, both of Nuevo Leon, Mexico

[73] Assignee: Hylsa, S.A., Monterrey, Mexico

[21] Appl. No.: 607,466

[22] Filed: May 7, 1984

[51] Int. Cl.$^4$ .......................... C21B 13/02; F27B 1/20
[52] U.S. Cl. ..................................... 75/34; 266/160; 266/183
[58] Field of Search ................... 75/26, 34, 35, 29, 91; 266/160, 183

[56] References Cited

U.S. PATENT DOCUMENTS

| | | |
|---|---|---|
| 1,433,854 | 10/1922 | Sinding-Larsen . |
| 1,729,776 | 10/1929 | Hare . |
| 1,758,786 | 5/1930 | Ekelund . |
| 2,068,448 | 1/1937 | Cox . |
| 2,210,720 | 8/1940 | Johnson et al. . |
| 2,321,310 | 6/1943 | Moore . |
| 2,334,434 | 11/1943 | Patterson ............................... 75/91 |
| 2,427,329 | 9/1947 | Schweikart . |
| 2,502,501 | 4/1950 | Armitage . |
| 2,619,449 | 11/1952 | Sweetser . |
| 2,627,455 | 2/1953 | Berg . |
| 2,640,014 | 5/1953 | Berg . |
| 2,760,920 | 8/1956 | Olsen . |
| 3,235,374 | 2/1966 | Mahony . |
| 3,923,498 | 12/1975 | Volk . |
| 3,998,205 | 12/1976 | Scragg . |
| 4,149,856 | 4/1979 | Keller . |
| 4,229,184 | 10/1980 | Gregg . |
| 4,380,469 | 4/1983 | Sulzbacher .............................. 75/38 |

FOREIGN PATENT DOCUMENTS 1329692  5/1963  France .
 634228  3/1950  United Kingdom .

OTHER PUBLICATIONS

J. J. Newsletter, vol. III, No. 1, Jan. 1983.
Oil Shale Retorting Technology, CEP Feb. 1983, pp. 45–50.

Primary Examiner—Melvyn J. Andrews
Attorney, Agent, or Firm—Curtis, Morris & Safford

[57] ABSTRACT

Particulate iron ore is reduced to sponge iron in a vertical shaft reduction reactor by forcing the ore upwardly in a moving bed counter-current to a descending stream of hot reducing gas produced by the gasification of coal in a gasifier, for example, a melter-gasifier, containing a molten iron bath and producing a hot dust-laden gas. The product sponge iron may be used as a feed material for the molten bath in the gasifier. The reactor is equipped with a gas outlet plenum containing a renewable body of ore to minimize clogging at the gas outlet.

19 Claims, 1 Drawing Figure

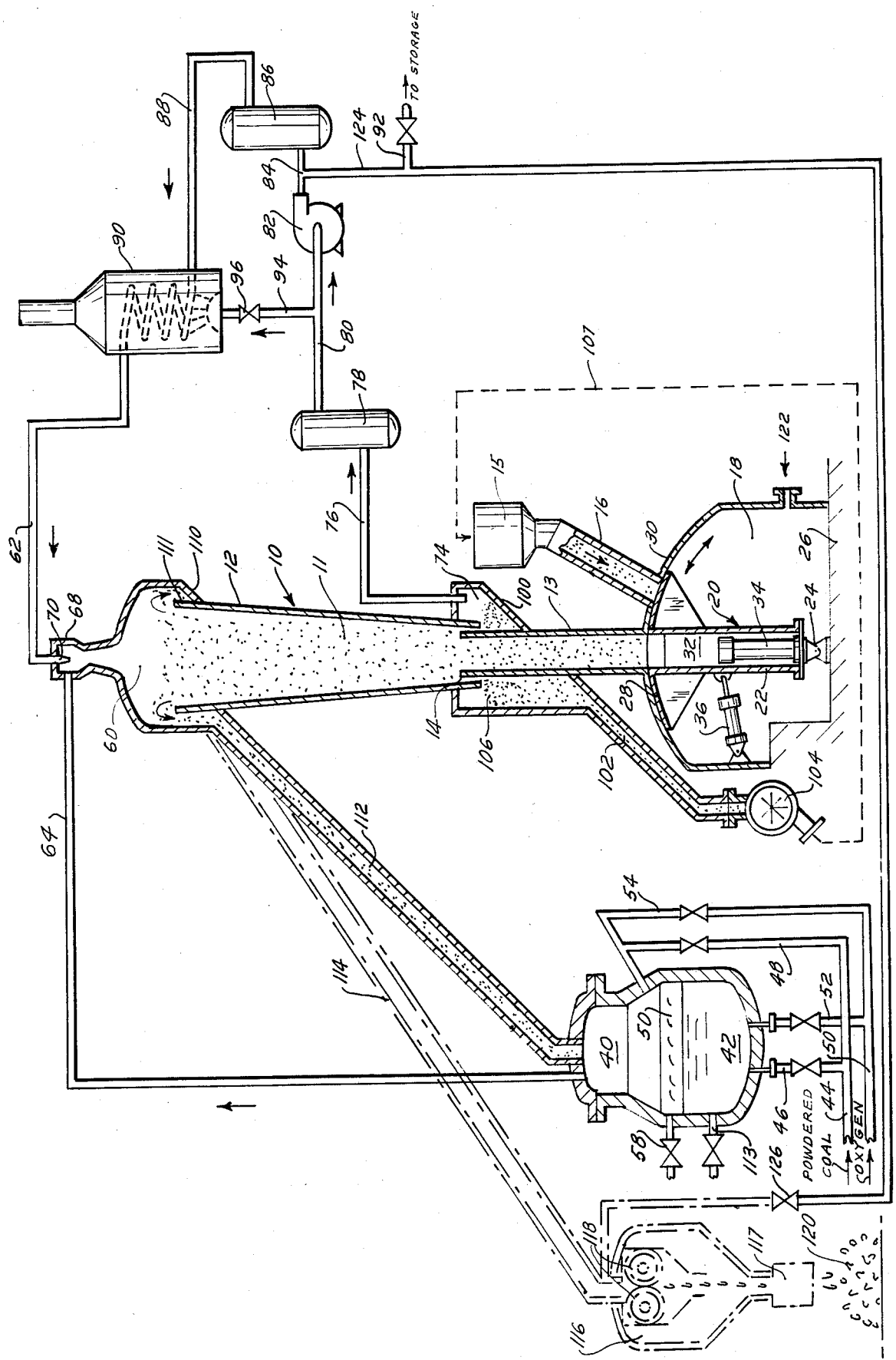

METHOD OF REDUCING IRON OXIDES

This invention relates to the gaseous reduction of particulate iron ore to sponge iron in a vertically arranged, moving bed reactor, and more particularly, to a novel way of operating such a reactor that is especially useful in those cases where the reducing gas for effecting the reduction of the ore is produced by gasifying a carbon-containing fuel, i. e. a carbonaceous solid or liquid.

BACKGROUND OF THE INVENTION

The direct reduction of iron ore in vertical shaft, moving bed iron ore reduction reactors has long been known. Representative processes for effecting such gaseous reduction are disclosed, for example, in U.S. Pat. Nos. 3,765,872; 3,779,741; 4,150,972; 4,216,011; and 4,338,123. In such systems reduction of the ore has commonly been effected by a reducing gas largely composed of carbon monoxide and hydrogen obtained by catalytic reformation of a mixture of natural gas and steam. In such systems the ore to be reduced is typically fed to the top of a vertical shaft reactor and flows downwardly through a reduction zone thereof in contact with an upwardly flowing hot reducing gas to convert the iron ore to sponge iron. Effluent gas from the reduction zone of the reactor is cooled to remove water therefrom, and in most cases a major part of the cooled effluent gas is reheated and recycled to the reducing zone. At its lower end the reactor is provided with some means for controlling the discharge of sponge iron from the reactor, e.g. a rotary discharge valve, a vibratory chute, conveyor belt or the like.

Catalytic reformers for producing the carbon monoxide/hydrogen reducing gas mixtures for use in such moving bed reactors are relatively expensive and natural gas used as a feed material for the reformer is not always readily available at an acceptable cost. Hence it has been proposed that the reducing gas be generated in a coal gasifier, for example, a melter-gasifier of the type in which powdered coal and an oxidant gas are fed to a molten metal bath. The coal is partially burned by the oxidant gas, advantageously oxygen, to generate heat that maintains the bath molten and to produce a reducing gas suitable for use in the ore reduction reactor. The ash from the combustion of the coal is removed from the gasifier periodically or continuously as a molten slag. Suitable melter-gasifiers of this type are known in the art.

While in general coal gasifiers provide a relatively inexpensive source of reducing gas, their use leads to certain other operating problems. Thus the gas generated in the gasifier is relatively dusty and the dust tends to clog the interstices between the ore particles in the reactor. If the gas is scrubbed with a scrubbing liquid to remove the dust, its sensible heat is lost and the gas must be reheated before being introduced into the reactor. Also, one of the problems encountered in the operation of a moving bed reduction reactor is the tendency of the ore particles to agglomerate and form large aggregates and such agglomeration impedes the flow of solids through the reactor

SUMMARY OF THE INVENTION

It is accordingly an object of the present invention to provide a method for the gaseous reduction of iron ore that is especially useful in cases where the reducing gas is derived from the gasification of coal or other carbon-containing fuel. It is another object of the invention to provide an ore reduction process of this type which permits the use of a dusty reducing gas while overcoming the clogging and agglomeration problems referred to above. It is still another object of the invention to provide in a moving bed gaseous reduction reactor a novel type of gas outlet structure having a renewable gas/solid interface that eliminates the accumulation of fine particles and consequent partial blockage of the gas outlet that sometimes occurs in prior art reactors. It is a further object of the invention to provide a method for reducing iron ore to sponge iron in a vertical moving bed reduction reactor, which method produces a smaller proportion of fines than prior methods. Other objects of the invention will be in part obvious and in part pointed out hereafter.

The objects and advantages of the invention are achieved in general by reversing the normal direction of flow of the ore particles through the reactor, i. e. by using an upwardly moving bed of ore particles and a downward flow of the reducing gas. The ore particles are forced upwardly through the reactor shaft countercurrent to the descending reducing gas and the reduced ore, e. g. sponge iron pellets, pass over the upper periphery of the reactor and are removed therefrom by gravitational flow. The reactor wall diverges outwardly and upwardly to facilitate flow of solids therethrough.

With this mode of operation dust-laden gas can be used without causing blockage problems. To the extent that dust accumulates in the ore body it is carried continuously upward and discharged with the reduced ore at the top of the reactor. In like manner, fine material formed due to interparticle abrasion in the moving bed, as well as particle aggregates formed by the agglomeration of particles within the reactor, are carried upward for discharge at the top of the reactor and do not impede the flow of solids or gases as they sometimes do in a downwardly moving ore bed.

In recent years it has become increasingly common to pelletize the iron ore before feeding it to a moving bed reactor because the iron ore pellets are stronger than lump ore and have less tendency to disintegrate into undesired fine particles. The ore pellets are also stronger than the product sponge iron pellets formed by reduction of the ore pellets. In a conventional reactor with a downwardly moving bed the relatively weak sponge iron pellets are the bottom of the bed and subject to the pressure exerted by the total weight of the bed which tends to promote their disintegration. With the upflow bed of the present invention the relatively strong ore pellets are at the bottom of the bed and the relatively weak sponge iron pellets are near the top of the bed. Thus with an upflow bed there is less tendency to produce fines.

The upflow bed is also advantageous from the standpoint of minimizing agglomeration of the pellets. Increasing pressure tends to promote agglomeration of the hot pellets in the moving bed. With an upflow bed the hottest pellets are at the top of the bed where the pressure from overlying pellets is minimal.

The upward divergence of the reactor wall in combination with an upflow bed is advantageous in respect to both the pellet disintegration and the pellet agglomeration problems. In conventional downflow reactors there is usually at least one level at which the pellet flow path converges, thus increasing the inter-pellet pressure. With the reactor of the present invention such increases in the inter-pellet pressure are avoided.

BRIEF DESCRIPTION OF THE DRAWING

The objects and advantages of the invention can be more fully understood and appreciated by reference to the accompanying drawing which schematically illustrates a reduction system wherein iron ore to be reduced flows upwardly through a vertical shaft reactor countercurrently to a downwardly flowing stream of hot dusty reducing gas produced from coal in a melter-gasifier.

DETAILED DESCRIPTION OF EMBODIMENTS

Referring to the drawing, the numeral 10 generally designates a vertical shaft reduction reactor through which a bed of particulate iron ore 11 is forced upwardly. The reactor 10 comprises an upper section 12 and a lower section 13, both of which have an inverted conical configuration. The upper end of section 13 extends into the lower end of section 12 to define an annular discharge opening 14 through which spent reducing gas leaves the reactor, as more fully described below.

Iron ore to be reduced is stored in a bin 15 from which it flows by gravity through a conduit 16 to a feed chamber 18 and more particularly, to a feed mechanism located within the feed chamber and generally designated by the numeral 20. The mechanism 20, which may be of the general type described in U.S. Pat. No. 2,627,455, operates to transfer ore from the discharge end of conduit 16 to the bottom of bed 12 and force the ore particles upwardly through shaft reactor 10.

As shown in the drawing, the feed mechanism comprises a feed tube 22 pivotally mounted at its lower end by pivot 24 to the floor 26 of chamber 18 and having at its upper end a baffle 28 curved to conform with the curvature of the top 30 of chamber 18. Within the feed tube 22 there is a reciprocable piston 32 that can be moved axially of the feed tube by a first hydraulic cylinder 34. A second hydraulic cylinder 36 interconnects the feed tube 22 with the side wall of chamber 18 in such manner that operation of cylinder 36 causes the feed tube to be rocked around pivot 24.

When feed tube 22 is in its vertical position as shown in the drawing, it is in axial registry with the bottom end of shaft 13, and the right-hand portion of baffle 28 is positioned to block the discharge end of feed conduit 16. Hydraulic cylinder 36 is operable to cause the feed tube 22 to rock on pivot 24 until it is in axial registry with feed conduit 16 and the left-hand portion of baffle 28 is positioned to block the lower end of shaft 13. In operation the feed tube is positioned by the hydraulic cylinder 36 in registry with conduit 16, and hydraulic cylinder 34 is operated to withdraw piston 32 into feed tube 22 and permit a charge of ore particles to flow into the feed tube. Hydraulic cylinder 36 then rocks the feed tube back into its vertical position and cylinder 34 is operated to cause piston 32 to force the charge of the ore particles into the bottom of shaft 13. Repetitive charging and discharging of the feed tube in this manner causes the particulate bed 12 to move upwardly through shaft 13.

Reducing gas for reducing the ore to sponge iron is generated in a melter-gasifier 40 which may be of a suitable and well known type wherein a bath of molten iron 42 is used as a reaction medium and powdered coal and oxygen are fed to the bath in such proportions as to generate a reducing gas. More particularly, powdered coal is supplied to the melter-gasifier through supply pipe 44 and branch pipes 46 and 48, and oxygen is supplied through supply pipe 50 and branch pipes 52 and 54. Within the gasifier the coal is partially burned to maintain the reaction bath 42 molten and to generate a reducing gas largely composed of carbon monoxide and hydrogen. The ash content of the coal accumulates as a molten layer 56 on the top of the molten iron bath 42 and is removed intermittently or continuously through pipe 58.

At the top of the reactor 10 there is a gas inlet chamber or plenum 60 through which reducing gas flows to the top of the ore bed 12 and thence downwardly through the bed to reduce the ore to sponge iron. The gas feed to the inlet chamber comprises a mixture of recycled gas from pipe 62 and make-up gas supplied from the gasifier 40 through pipe 64. To promote mixing of the two gas streams a Venturi-type injector 68 is used comprising a nozzle 70 which receives recycle gas at an elevated pressure from pipe 62 and forms a jet that draws in hot gas from the gasifier discharge pipe 64. The injector 68, in addition to promoting mixing of the gas streams, also reduces the pressure at the discharge end of pipe 64 and thus permits the reactor to operate at a higher pressure than the gasifier.

The reducing gas mixture, preferably at an initial temperature of 700° to 900° C., flows downwardly through the ore bed 11, reducing the ore particles therein to sponge iron, and thence through annular discharge opening 14 into a gas outlet plenum 74. Most of the spent gas leaving the reactor is upgraded and recycled thereto. In particular, gas is withdrawn from plenum 74 through pipe 76 and flows successively through a cooler 78, wherein it is de-watered, pipe 80, pump 82, pipe 84 and carbon dioxide absorber 86. The resulting upgraded gas flows through pipe 88 to a heater 90 which re-heats the gas. The outlet of the heater is connected to pipe 62 referred to above. A portion of the recycled gas is withdrawn from pipe 80 through branch pipe 94 containing regulating valve 96 and used as a fuel gas in heater 90. To the extent that gas may accumulate in excess of that consumed in the system, it may be withdrawn from pipe 84 through a pipe 124 and branch pipe 92 and conducted to a suitable point of use or storage.

Reverting now to the configuration and function of the gas outlet plenum 74, there is a tendency for the discharge opening 14 to become partially clogged over a period of time and interfere with the free flow of gas therethrough. To deal with this problem the annular opening 14 and plenum 72 are constructed and arranged to provide for a continual renewal of the ore/gas interface in the plenum. In particular, the plenum 74 has a conical bottom 100 leading to a duct 102 terminating at the rotary discharge valve 104. Ore particles flowing through the opening 14 initially assume a normal angle of repose in plenum 74 and have a free upper surface 106 through which the exiting gas flows. Periodically, or continuously if desired, the rotary discharge valve is operated to cause particles to flow from plenum 74 downwardly through duct 102, whereupon a further quantity of ore particles flows through the discharge opening 14 to renew the surface 106. As indicated by the dotted line 107, particles discharged through valve 104 can be returned to the storage bin 15.

As generally described above, the ore bed 11 is forced upwardly through the reactor 10 and the particles thereof are reduced by the downwardly flowing hot reducing gas to sponge iron, which is then removed from the reactor. More particularly, the chamber 60 is provided with a conical bottom 110 and sponge iron particles reaching the top of reactor 10 overflow its upper perimeter 111 into this conical portion 110 of chamber 60 and thence through a duct 112 to the gasifier 40 wherein they are melted by the heat generated by the reaction of coal and oxygen in the gasifier. Molten metal can be removed from the gasifier, either continuously or intermittently, through pipe 113 and used, e. g., as a charging stock for a steel-making furnace.

In cases where it is desirable to store the sponge iron product or transport it to a remote location, the particulate product may be cooled and briquetted. Apparatus for performing such a briquetting operation is illustrated in dotted lines in the drawing. In accordance with this alternative, sponge iron pellets flow from the conical bottom 110 of chamber 60 throu9h a duct 114 to a briquetting chamber 116. Within chamber 116 there are a pair of pressure rolls 118 for converting the sponge iron into briquettes that are discharged from chamber 116 at 120. In cases where the reactor operates at an elevated pressure, a pressure lock or seal 117 is used at the discharge end of chamber 116. Also, when pressure operation is used, suitable locks or seals of known construction are required in conduit 16 and duct 102, and the feed chamber 18 is desirably pressurized with an inert gas through connection 122.

If it is desired to cool the sponge iron particles descending through duct 114 before they are discharged, such cooling can be accomplished by diverting a small amount of recycle gas flowing through pipe 84 to pipe 124 which contains regulating valve 126 and is connected to the bottom of duct 114 in such manner that the recycle gas flows upwardly through the duct and cools the descending sponge iron particles.

From the foregoing description it should be apparent that the present invention provides a process for the gaseous reduction of iron ore capable of achieving the several objectives recited above. By using an upwardly moving bed the problems of clogging due to fines and agglomeration of particles into large aggregates, both of which tend to impede solids and/or gas flow through the reactor, are largely overcome, since any aggregates formed are carried upwardly through a shaft of increasing cross-sectional area having an unobstructured upper perimeter over which the aggregated material can flow. Hot dust-laden gases can be used without difficulty since much of the dust is screened out in the upper portion of the bed and carried upwardly out of the reactor.

It is, of course, to be understood that the foregoing description is intended to be illustrative only and that numerous changes can be made in the system described within the scope of the invention as defined in the appended claims.

What is claimed is:

1. A method for the direct gaseous reduction of particulate iron ore to sponge iron in a vertical shaft reactor which comprises gasifying carbon-containing fuel in a gasifier to produce a hot reducing gas, forcing said ore into said reactor near the bottom thereof to form a substantially vertically arranged, self-supporting, upwardly moving ore bed in said reactor, causing said hot reducing gas to flow downwardly through the upwardly moving bed of ore in said reactor to reduce the ore to sponge iron and removing product sponge iron from a point near the top of said reactor.

2. A method for the direct gaseous reduction of iron ore to sponge iron in a vertical shaft reactor using gas generated by the gasification of carbon-containing fuel in a gasifier which comprises forcing said ore into said reactor near the bottom thereof to form a substantially vertically arranged, self-supporting, upwardly moving ore bed in said reactor, feeding a particulate carbonaceous fuel and oxidizing gas to said gasifier to produce a hot dusty reducing gas, causing said hot gas to flow downwardly through the upwardly moving ore bed in said reactor to reduce the ore to sponge iron and removing product sponge iron from a point near the top of said reactor.

3. A method for the direct gaseous reduction of particulate iron ore to sponge iron in a vertical shaft reactor using gas generated by the gasification of carbon-containing fuel in a gasifier which comprises forcing said ore into said reactor near the bottom thereof to form a substantially vertically arranged, self-supporting, upwardly moving ore bed in said reactor, establishing a molten metal bath in said gasifier, feeding particulate carbonaceous fuel and oxidizing gas to said bath to produce heat to maintain said bath molten and a hot dusty reducing gas, causing said hot gas to flow downwardly through the upwardly moving bed of ore in said reactor to reduce the ore to sponge iron, and removing product sponge iron from a point near the top of said reactor.

4. A method according to claim 3 wherein said bath is a molten iron bath, the product sponge iron from said reactor is fed to the molten bath and molten iron is removed from said gasifier.

5. A method according to claim 3 wherein reducing gas is withdrawn from a gas discharge zone near the bottom of said moving bed, carbon dioxide is removed therefrom and the gas is then recycled to the top of said bed.

6. A method according to claim 5 wherein the recycled gas is cooled before removal of carbon dioxide therefrom and then reheated before being returned to said reactor.

7. A method according to claim 3 wherein a minor portion of the particulate iron ore from said moving bed is removably supported in a gas discharge zone to provide a renewable ore/gas interface, and as spaces between the iron ore particles in said gas discharge zone become clogged such iron ore particles are removed from said zone and replaced by other ore particles from said moving bed.

8. A method according to claim 5 wherein a portion of the recycled gas is withdrawn from the system.

9. A method according to claim 2 wherein said carbonaceous fuel is coal and said oxidizing gas is oxygen.

10. A method according to claim 3 wherein said carbonaceous fuel is coal and said oxidizing gas is oxygen.

11. A method according to claim 7 wherein said carbonaceous fuel is coal and said oxidizing gas is oxygen.

12. A method according to claim 11 wherein said bath is a molten iron bath, the product sponge iron from said reactor is fed to the molten bath and molten iron is removed from said gasifier.

13. A method according to claim 5 wherein said recycled gas is injected into said reactor as a pressure jet and said jet is located near the point of introduction of said hot reducing gas into said reactor, whereby said gas jet promotes mixing of said recycle gas and the added hot reducing gas and provides for operation of said reactor at a higher pressure than said gasifier.

14. Apparatus for the direct gaseous reduction of iron ore comprising in combination a vertical shaft reactor, means for feeding ore to the bottom of said reactor to cause it to be forced upwardly therein, a source of hot reducing gas, conduit means for conducting gas from said source to the top of said moving ore bed to cause said gas to flow downwardly through the bed, a gas outlet chamber surrounding a lower portion of said reactor and communicating with the interior thereof, whereby ore particles can flow outwardly from said reactor into said chamber to form a porous body having a free upper surface through which spent reducing gas can be withdrawn from said reactor, said gas outlet chamber having a downwardly extending discharge conduit through which ore particles can be withdrawn to cause further quantities of ore particles to flow from said reactor to said chamber and renew the surface through which gas is removed from the reactor, and means for removing product sponge iron from a point near the top of said reactor.

15. Apparatus according to claim 14 wherein the feeding means for said ore includes an ore storage bin and ore particles removed through said discharge conduit are recycled to said storage bin.

16. Apparatus according to claim 14 wherein said source of reducing gas comprises a melter-gasifier having a molten iron bath therein and means for feeding oxidizing gas and carbonaceous fuel to said bath.

17. Apparatus according to claim 16 wherein said product removal means comprises a sponge iron conduit for conducting sponge iron from the top of said moving bed to said gasifier and said gasifier has a discharge conduit for discharging molten metal therefrom.

18. Apparatus according to claim 14 wherein said reactor comprises upper and lower sections having upwardly diverging walls, and said sections cooperate to define an annular discharge opening communicating with said gas outlet chamber.

19. Apparatus according to claim 18 wherein the upper end of said lower section extends into the lower end of said upper section.

* * * * *

UNITED STATES PATENT AND TRADEMARK OFFICE
CERTIFICATE OF CORRECTION

PATENT NO. : 4,578,110

DATED : March 25, 1986

INVENTOR(S) : Juan F. Price-Falcon et al.

It is certified that error appears in the above-identified patent and that said Letters Patent is hereby corrected as shown below:

Column 6, line 43, delete "said" and insert --a--.

Signed and Sealed this

Twenty-second Day of July 1986

[SEAL]

Attest:

DONALD J. QUIGG

Attesting Officer

Commissioner of Patents and Trademarks